Jan. 6, 1948.    G. E. HUSTED    2,433,906
FILM CLAMP
Filed Dec. 21, 1943

INVENTOR.
G. EDDIE HUSTED.
BY
*A. Schapp*
ATTORNEY.

Patented Jan. 6, 1948

2,433,906

UNITED STATES PATENT OFFICE 2,433,906

FILM CLAMP

George Eddie Husted, San Francisco, Calif.

Application December 21, 1943, Serial No. 515,087

3 Claims. (Cl. 24—263)

The present invention relates to improvements in film clamps, and its principal object is to provide a film clamp adapted for use in connection with a camera for facilitating the removal of a used portion of the film without disturbing the unused portion in its position with respect to the conventional film backing.

In many cameras the film is furnished in the form of a roll wound upon a spool, with a backing or cover overlying the film to separate the windings on the spool and to serve as a carrier for advancing the film for successive exposures, the free end of the backing being attached to a second spool which is spaced from the first spool. The free end of the film is attached to the backing at a point spaced from the end thereof.

The film is sufficiently long for a number of different exposures, usually six or eight, and the operator frequently is anxious, after a few pictures have been taken, to remove the exposed portion of the film from the camera for developing, without disturbing the remaining portion of the film, particularly with respect to its position in connection with the cover or backing.

This operation is difficult to perform, since as a rule, when the film is cut at a line between the exposed and non-exposed portions, the remaining portion of the film will become dislocated with respect to the backing and will not follow a true course upon further unwinding.

In the present invention it is proposed to provide means for firmly clamping the film and the backing or cover into a compact unit adjacent the line where the film is to be cut, so that after the exposed portion has been removed, the end of the remaining portion may be secured upon the backing by means of a strip of adhesive tape, and may be advanced with the latter in the same manner as if the portion had not been removed.

It is further proposed to provide a film clamp of the character described, that may be readily applied to the film and backing while the latter are in assembled relation in the camera and without disturbing the arrangement before the clamping action takes effect.

And finally it is proposed to provide a film clamp that is extremely simple in construction and may be manufactured at a nominal cost.

Further objects and advantages of my invention will appear as the specification proceeds, and the novel features of the invention will be fully set forth in the claims hereto attached.

The preferred form of my invention is illustrated in the accompanying drawing forming part of this application, in which.

Figure 2:
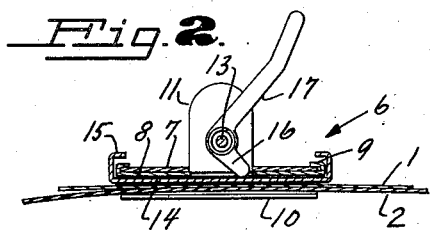
Figure 2 shows a section taken along line 2—2 of Figure 1, with the parts in position prior to the clamping operation.
Figure 4:
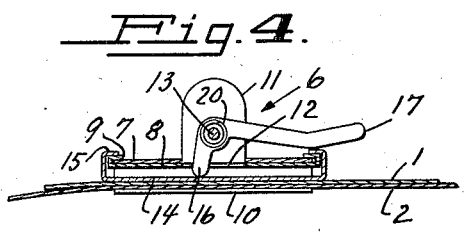
Figure 3:
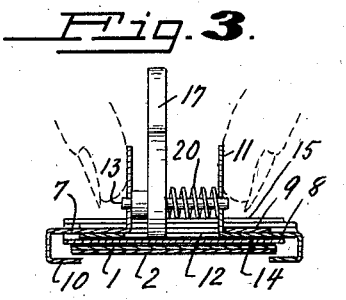
Figure 5:
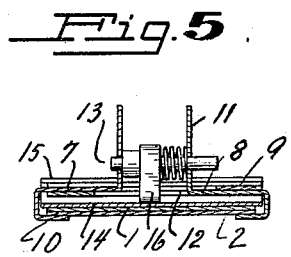

Figure 3, a section taken along line 3—3, with the parts in position prior to the clamping operation;

Figure 4, a section similar to that of Figure 2, with the parts shown in position after the clamping operation; and Figure 5, a section similar to that of Figure 3, with the parts in position after the clamping operation.

While I have shown only the preferred form of my invention, I wish to have it understood that various changes or modifications may be made within the scope of the claims hereto attached, without departing from the spirit of the invention.

Referring to the drawing in detail, the film 1, backed by the cover 2, is shown as partly wound on the original spool 3 and partly on the feed spool 4, with an intermediate portion stretched between the spools.

The housing of the camera is not shown in the drawing, but it may be assumed that the intermediate length of the film lies flat against the rear wall of the housing, although this is not necessary for the purpose of the present invention.

It may be further assumed that a number of pictures have already been taken, and that it is desired to cut the film along the line 5. The film clamp 6 is applied to the unexposed portion of the film backwardly of the line 5, as shown in the drawing, the whole operation being performed, of course, in a dark chamber to prevent the film from being exposed.

My film clamp comprises a pair of plates 7 and 8, one being slidable within side flanges 9 projecting from the other, and the two plates having opposing end flanges 10 normally spaced by a distance substantially equal to the width of the film and adapted to be engaged over opposite edges thereof.

The two plates have upstruck ears 11 projecting in spaced and parallel relation from a central portion of the plates in a direction opposite to that of the flanges 10, the two ears leaving registering apertures 12, so that one of the ears is free to move in the aperture of the other.

The two flanges 10 may be drawn toward one another for a closer fit upon the edges of the film by manipulation of the ears.

The ears support a shaft 13, one of the ears being slidable thereon, and a spring 20 on the shaft urges the ears apart and tends to separate the flanges 10 to their maximum distance, controlled by the length of the apertures 12.

A pressure plate 14 is loosely supported between the sliding plates 7 and 8 on one hand and their flanges 10, the pressure plate being held in position against sidewise removal by means of flanges 15 projecting over the flanges 9 with sufficient play to allow of a certain amount of movement of the pressure plate 14 between the sliding plates 7 and 8 and their respective flanges, as clearly appears from a comparison of Figures 2 and 4.

A cam 16 is mounted on the shaft 13 and operable by a handle 17 to bear on the pressure plate 14 through the apertures 12 in the sliding plates to force the pressure plate toward the flanges 10 for clamping the latter upon the interposed film and cover.

Figure 1:
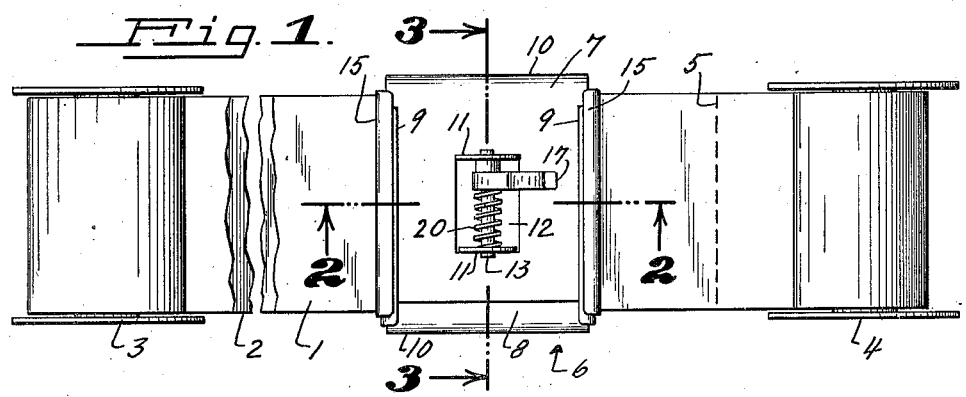
Figure 1 shows my film clamp in plan view, as applied to a camera film.

In operation:

The clamp is normally in extended position, as shown in Figures 1, 2 and 3, with the spring 20 expanded and the handle 17 in an upright position.

The inner edges of the flanges 10 are spaced substantially by the width of the film, possibly slightly less, so that the clamp may be lowered upon the film 1 and the underlying backing 2 and the flanges brought to a position below the backing.

The operator then presses the ears 11 toward one another for drawing the flanges 10 underneath the film backing and snaps over the handle 17 for urging the pressure plate 14 upon the film and for firmly clamping the film and the film backing between edge portions of the pressure plate 14 and the flanges 10. This operation also locks the spring 20 in compressed condition.

Next, the operator cuts the film along line 5, removes the exposed portion of the film, and secures the end of the remaining portion of the film to the film backing by means of adhesive tape or the like.

If the winding on the spool 4 has become loose during this operation, it is re-wound to straighten out the length of the film and backing between the spools.

The unexposed portion of the film now occupies the same position with respect to the backing as it did before, and will freely advance with the backing in the same manner as if the film had been left undisturbed altogether.

I claim:

1. In a clamp for clamping superimposed strips of material, a pair of rectangular plates arranged in face to face relation with freedom of sliding movement, a pair of side flanges on one of the plates and turned over the other plate to hold the latter against turning movement, opposing end flanges on the plates adapted for engagement under opposite edges of the strips, the plates being operable for drawing the flanges toward one another to close in on the strips, a pressure member interposed between the end flanges and the plate to overlie the strips and means for drawing the end flanges toward the pressure member, the pressure member having edge portions disposed in confronting relation to the end flanges and cooperable therewith for clamping the edges of the strips therebetween when the flanges are drawn toward the pressure member, and the pressure member having side flanges turned over the side flanges of the plates for holding the pressure member to the plates to form a unit therewith.

2. In a clamp for clamping superimposed strips of material, a contractible unit having upturned opposing end flanges adapted for engagement over opposite edges of the strips and having means normally expanding the same, a pressure member interposed between the flanges and the unit, the pressure member having edge portions disposed in confronting relation to the flanges and cooperable therewith for clamping the edges of the strips therebetween when the flanges are drawn toward the pressure member, and cam means operable for drawing the flanges toward the pressure member and for locking the unit in contracted position in one operation, the pressure member having side flanges turned over the side edges of the unit for holding the pressure member to the unit.

3. In a clamp for clamping superimposed strips of material, a pair of plates, one slidable over the other, and having upturned end flanges adapted for engagement under opposite edges of the strips, means urging the flanges apart, the plates having means operable for contracting the flanges to engage underneath the edges of the strips, a pressure member interposed between the flanges and the plates, the pressure member having edge portions disposed in confronting relation to the flanges and cooperable therewith for clamping the edges of the strips therebetween when the flanges are drawn toward the pressure member and the pressure member having side flanges turned over the side edges of the plates for holding the pressure member to the plates.

GEORGE EDDIE HUSTED.

REFERENCES CITED

The following references are of record in the file of this patent:

UNITED STATES PATENTS

| Number | Name | Date |
| --- | --- | --- |
| 204,224 | Hubert | May 28, 1878 |
| 827,260 | Nickles | July 31, 1906 |
| 1,556,579 | Baltzley | Oct. 13, 1925 |
| 1,763,128 | Bolland | June 10, 1930 |
| 1,829,332 | Beck | Oct. 27, 1931 |
| 2,180,064 | Nuchterlein | Nov. 14, 1939 |
| 2,208,358 | Chandler | July 16, 1940 |